US008373596B1

United States Patent
Kimball et al.

(10) Patent No.: US 8,373,596 B1
(45) Date of Patent: Feb. 12, 2013

(54) DETECTING AND LOCATING RF EMISSIONS USING SUBSPACE TECHNIQUES TO MITIGATE INTERFERENCE

(75) Inventors: Steven F. Kimball, Auburn, NH (US); Cedric L. Logan, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 333 days.

(21) Appl. No.: 12/762,835

(22) Filed: Apr. 19, 2010

(51) Int. Cl.
 *G01S 5/04* (2006.01)
(52) U.S. Cl. ........................................ 342/444; 342/445
(58) Field of Classification Search .................. 342/427, 342/443–445, 465
 See application file for complete search history.

(56) References Cited

U.S. PATENT DOCUMENTS

| | | | |
|---|---|---|---|
| 4,594,595 A | 6/1986 | Struckman | |
| 6,670,920 B1 | 12/2003 | Herrick | |
| 7,126,533 B2 | 10/2006 | Fiore et al. | |
| 7,233,285 B2 | 6/2007 | Struckman | |
| 7,268,728 B1 | 9/2007 | Struckman | |
| 7,292,198 B2 | 11/2007 | Shtrom et al. | |
| 7,358,891 B2 | 4/2008 | Struckman et al. | |
| 7,358,912 B1 | 4/2008 | Kish et al. | |
| 7,362,280 B2 | 4/2008 | Shtrom et al. | |
| 7,436,351 B2 | 10/2008 | Struckman et al. | |
| 7,453,400 B2 | 11/2008 | Struckman et al. | |
| 7,542,812 B2 | 6/2009 | Stroili et al. | |
| 2006/0098616 A1 | 5/2006 | Kish et al. | |
| 2006/0109067 A1 | 5/2006 | Shtrom | |
| 2006/0192720 A1 | 8/2006 | Shtrom | |
| 2007/0026807 A1 | 2/2007 | Kish | |
| 2007/0197229 A1 | 8/2007 | Kalliola et al. | |
| 2007/0252666 A1 | 11/2007 | Shtrom | |
| 2008/0129640 A1 | 6/2008 | Shtrom et al. | |

OTHER PUBLICATIONS

DRS Technologies, SIGINT Tuners: Miniatures, VME, PCi, Transceiver, Rackmount, www.drs-ss.com/products/ss/listing_tuners.php, downloaded from Internet Mar. 22, 2010, 6 pages.
ICS-554, Software Defined Radio, Sensor Processing, DSP & Data Acquisition, www.ge-ip.com/products/2052, downloaded from internet Mar. 22, 2010, 4 pages.
"Crescent Vector OEM Board", Hemisphere GPS (2 pages) © Copyright Jul. 2007, Hemisphere GPS Inc.
"First Responder Interoperable Communications System", BAE Systems Electronics & Integration Solutions (5 pages) PUBS-07-D23-REV081, downloaded from Internet Aug. 11, 2009.
"First Intercomm the First InterComm Solution", BAE Systems (1 page) Copyright © 2006-2009 BAE Systems.
"Kismet (software)", Wikipedia, the free encyclopedia (2 pages) http://en.wikipedia.org/wiki/Kismet_(software), printed from Internet on Jan. 23, 2009.

(Continued)

*Primary Examiner* — Dao Phan
(74) *Attorney, Agent, or Firm* — Finch & Maloney PLLC; Neil F. Maloney

(57) ABSTRACT

Techniques are disclosed that allow for the detection and locating of RF emitters. The technique includes recording emitter signals of interest received from the search area via an antenna array and a phase coherent receiver, wherein all frequency conversions carried out by the phase coherent receiver are performed in a phase coherent fashion across all the channels. The technique further includes identifying subspace of each channel using singular value decomposition (SVD), analyzing the subspace of each channel for the presence of a target signal, and direction finding and/or geolocating the target signal.

20 Claims, 8 Drawing Sheets

OTHER PUBLICATIONS

"Kismet", Latest Kismet stable release, (24 pages) http://www.kismetwireless.net/documentation.shtml, printed from Internet on Jan. 23, 2009.

Hippenstiel et al., Localization of Wireless Emitters Based on the Time Difference of Arrival (TDOA) and Wavelet Denoising (67 pages) by Ralph D. Hippenstiel, Tri T. Ha, Unal Aktas, May 1999.

"MediaFlex FAQs", Ruckus Wireless (3 pages) http://www.ruckuswireless.com/faqs/mediaflex, © 2005-2009 Ruckus Wireless, Inc.

"The Ultimate Wireless Multimedia Solution for Service Provider", Ruckus Wireless (1 page) http://www.ruckuswireless.com/products/mediaflex-home-products, © 2005-2009 Ruckus Wireless, Inc.

"NetStumbler", Wikipedia, the free encyclopedia (1 page), http://en.wikipedia.org/wiki/NetStumbler, printed from Internet Mar. 18, 2009.

"Model 2+", OQO Products (1 page) © 2009 OQO, Inc.

"RR7855 Radio Direction Finding System", Raven Research (8 pages), © 2004 Raven Research, Issue A Aug. 23, 1968.

"VAIO US Series Micro PC", Sony (2 pages) http://www.sonystyle.com/webapp/wcs/stores/servlet/ProductDisplay?storeId=10151&cata..., printed from Internet on Mar. 18, 2009.

"Yellowjacket-B 702.11b Wi-Fi Analysis System", Berkeley Varitronics Systems (2 pages), downloaded from Internet on Jan. 8, 2009.

Model 5126 Linear Power RF Amplifier, OPHIR RF, (1 page), downloaded from Internet on Mar. 18, 2009.

DETECTING AND LOCATING RF EMISSIONS USING SUBSPACE TECHNIQUES TO MITIGATE INTERFERENCE

FIELD OF THE DISCLOSURE

The invention relates to techniques for direction finding and locating sources of radio frequency (RF) electromagnetic radiation, including low-power emitters in the presence of interference.

BACKGROUND

Conventional techniques for locating RF emitters such as wireless access points and laptops with IEEE 802.11 capability and other such RF emitters are based on measuring the amplitude of the emitter with a portable receiver, and moving around to find the direction in which the amplitude increases. The general assumption is that the stronger the signal amplitude, the closer the emitter is believed to be. Several commercial locating devices have been developed for this purpose (e.g., Yellowjacket® 802.11b Wi-Fi Analysis System).

There are a number of problems associated with such amplitude-based techniques for locating emitters. For instance, the techniques tend to be highly inaccurate due to the incidence of RF multipath created by the RF waveforms emanating from the 802.11 and other such RF emitters. These waveforms bounce off conductive objects or surfaces in the environment, which in turn cause multiple false readings on increased amplitude (false directions) that subsequently disappear as the user leaves the multipath. Thus, conventional amplitude-based locating techniques can create false high amplitude paths to the target and will not work in a high multipath environment such as a neighborhood (e.g., street scene) or building (e.g., home, office building, or café). Moreover, lower power RF signals of interest are difficult to detect and locate in the presence of relatively strong interference.

There is a need, therefore, for techniques that allow for the detection and locating of RF emitters, and particularly low-power RF emitters in the presence of interference.

SUMMARY

One embodiment of the present invention provides a system for detecting and locating an RF emitter in a search area. The system includes an antenna array having a plurality of antenna elements, and a phase coherent receiver having a channel for each of the antenna elements, wherein all frequency conversions carried out by the phase coherent receiver are performed in a phase coherent fashion across all the channels. The system further includes a signal record module for recording emitter signals of interest received from the search area via the antenna array and phase coherent receiver, and a memory for storing data records generated by the signal record module. The system further includes a subspace signal separation module for receiving the data records and identifying subspace of each channel using singular value decomposition (SVD), and a signal detection module for analyzing the subspace of each channel for the presence of a target signal. The system further includes a locating module for direction finding and/or geolocating the target signal. The system may be installed, for example, in a ground vehicle or other suitable platform. The system may include a calibration module for carrying out a field calibration of the system, by measuring antenna array response to incident electromagnetic radiation from a known source located at a known location. In one such case, the calibration module is configured to generate a calibration table populated with gold-standard response data to which target emitter response data can be correlated. The subspace signal separation module may be further configured for channelizing data records generated by the signal record module. In another particular case, if the target signal is detected in more than one subspace, the signal detection module can be further configured to use a weighted sum of mixing matrix columns as an antenna response vector, and the locating module can use the antenna response vector for direction finding and/or geolocation. In another particular case, the locating module can be configured to accumulate bearings relative to position of the system provided by a Global Navigation Satellite System (GNSS) receiver to produce a geolocation, and wherein the GNSS-based geolocation is provided on a map display. In another particular case, the locating module employs a non line-of-bearing technique for geolocation.

Another embodiment of the present invention provides a method for detecting and locating an RF emitter in a search area. The method includes recording emitter signals of interest received from the search area via an array of antenna elements and a phase coherent receiver having a channel for each of the antenna elements, wherein all frequency conversions carried out by the phase coherent receiver are performed in a phase coherent fashion across all the channels. The method further includes storing data records generated by the recording, and identifying subspace of each channel using singular value decomposition (SVD). The method continues with analyzing the subspace of each channel for the presence of a target signal, and direction finding and/or geolocating the target signal. In some cases, the method may include carrying out a field calibration by measuring antenna array response to incident electromagnetic radiation from a known source located at a known location. In one such case, carrying out a field calibration includes generating a calibration table populated with gold-standard response data to which target emitter response data can be correlated. In other cases, the method may include channelizing the data records prior to identifying the subspace of each channel. In other cases, if the target signal is detected in more than one subspace, the method may include using a weighted sum of mixing matrix columns as an antenna response vector, and using the antenna response vector for direction finding and/or geolocation. In other embodiments, the method may include accumulating bearings (e.g., relative to position of a system carrying out the method) provided by a GNSS receiver to produce a geolocation. In one such case, the method may further include providing the GNSS-based geolocation on a map display.

Another embodiment of the present invention provides a non-transitory processor-readable medium encoded with instructions that, when executed by a processor, cause the processor to execute a process for detecting and locating an RF emitter in a search area. The process includes recording emitter signals of interest received from the search area via an array of antenna elements and a phase coherent receiver having a channel for each of the antenna elements, wherein all frequency conversions carried out by the phase coherent receiver are performed in a phase coherent fashion across all the channels. The process further includes storing data records generated by the recording, identifying subspace of each channel using singular value decomposition (SVD), analyzing the subspace of each channel for the presence of a target signal, and direction finding and/or geolocating the target signal. In one particular case, the process further includes carrying out a field calibration by measuring antenna array response to incident electromagnetic radiation from a known source located at a known location, wherein carrying out a field calibration includes generating a calibration table populated with gold-standard response data to which target emitter response data can be correlated. In another particular case, the process further comprises channelizing the data records prior to identifying the subspace of each channel. In another particular case, if the target signal is detected in more than one subspace, the process further includes using a weighted sum of mixing matrix columns as an antenna response vector, and using the antenna response vector for direction finding and/or geolocation. In another particular case, the process further includes accumulating bearings (e.g., relative to position of a system carrying out the process) provided by a GNSS receiver to produce a geolocation, and providing the GNSS-based geolocation on a map display.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
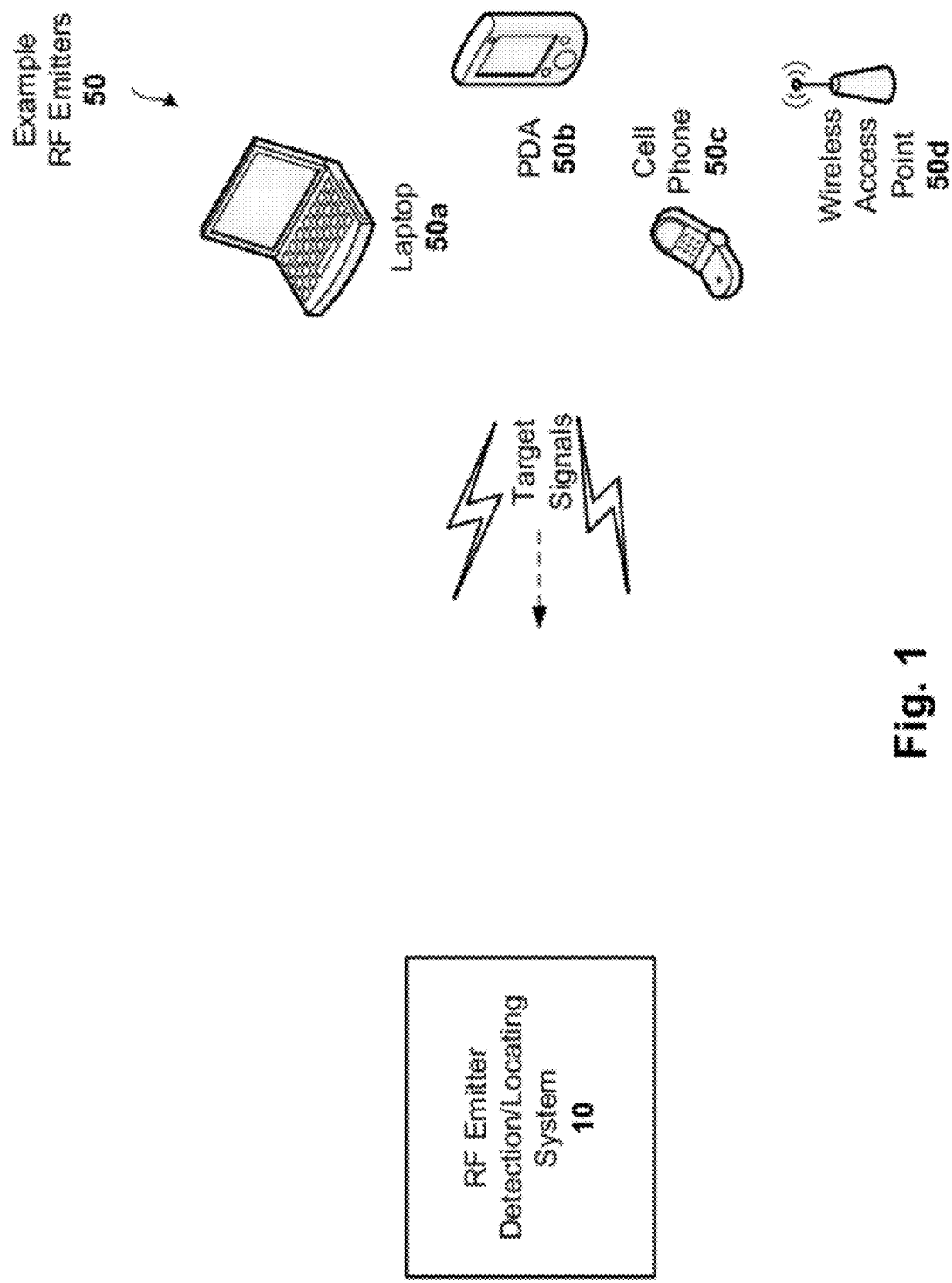
FIG. 1 illustrates a high-level block diagram of an RF emitter detection and locating system configured in accordance with an embodiment of the present invention.

Techniques are disclosed that allow for the detection and locating of RF emitters in a given environment. The techniques can be implemented, for example, in a mobile platform or system that is configured with a processor and corresponding software instructions for locating radio frequency (RF) emissions. This system can be programmed or otherwise configured to process incoming signals to isolate weak low-power signals of interest from higher-power interfering signals. Once a target signal is separated from the interference, its source can be precisely located using direction finding and/or geolocation techniques. As will be appreciated in light of this disclosure, the term geolocation as used herein may mean a location referenced to a geographic datum such as those associated with the World Geodetic System (e.g., WGS84) or other geodetic reference systems (such as North American Datums NAD27 and NAD83). Alternatively, the term geolocation may refer to an arbitrary local datum, in which case the term geolocation is synonymous with location.

General Overview

The use of tags which emit RF radiation attached to items (emitters of signals of interest) which need to be subsequently followed or located is well-known. However, there are a number of non-trivial factors which complicate this process. For instance, to provide maximum battery life and minimum potential for interference with other RF devices, it is a typical and desirable practice to minimize the radiated power of the RF emissions from the tag. This can make identifying such signals difficult, particularly in a strong interference environment.

Thus, and in accordance with an embodiment of the present invention, an RF emitter detection and locating system is described including detection and locating equipment that is programmed or otherwise configured for locating RF emissions with particular characteristics that make those emissions more robust to being detected and located, even at very low emitted power levels and/or among strong interfering signals. Once the system separates a target signal from interference that exists in the targeted search area, the source of the target signal can be located using direction finding and/or geolocation techniques, such as those based on measured voltage on antennas of the system. For instance, direction finding techniques can be used to identify a line of bearing (LOB) to a target IEEE 802.11 emitter (such as IEEE 802.11a/b/g/n/etc capable devices, all channels, or other emitters of interest) in a building or in an open field or along a roadside. In some cases, multiple LOBs can be used to geolocate the target emitter if so desired. In other embodiments, the system can execute non-LOB techniques for geolocation.

The system can be mounted, for instance, in a ground vehicle operated in the search area until a signal of interest is detected and located. Other mobile platforms (e.g., ship, unmanned aerial vehicle or UAV, airplane, etc) may also be used, as will be appreciated in light of this disclosure. The system generally includes an RF front-end having a multi-channel, fully phase coherent, RF receiver operatively coupled with an antenna array. The received RF signal information captured by the RF receiver can be combined with data from an embedded GNSS receiving unit to provide target and collection platform location information.

A system processor (e.g., laptop or other suitable processing environment) receives the output from the RF front-end and GNSS data. The processor, which can be configured to convert the received analog RF data to the digital domain and to adjust signal parameters to facilitate signal processing, is configured to execute blind adaptive subspace signal separation methods that facilitate target signal detection in the presence of interference. In operation, the system captures one or more data records via the RF front-end, and stores those data records in a memory accessible by the processor. A data record can be, for instance, data collected over a pre-determined time period (e.g., seconds or hours). Each data record is effectively separated into one or more frequency selective channels, by way of a channelizer or by virtue of the receiver selecting appropriate channels. The processor identifies the subspace of each channel, and analyzes each channel subspace for the presence of the target signal. Once a target signal is detected, its source can be precisely located using geo-observable parameter extraction.

The system and techniques do not interfere with service to the target device (operation is effectively transparent to target device). In addition, the techniques work at the hardware layer regardless of device mode, thereby bypassing various impediments such as encryption techniques, MAC address filters, and hidden SSIDs. The system and techniques can be used for a number of applications, such as finding 802.11 or Bluetooth emitters in rural and urban environments, or within a military zone. In addition, the system and techniques can be used for mapping publicly accessible access points (e.g., to identify unencrypted access points available for free use).

RF Emitter Detection/Locating System

FIG. 1 illustrates an RF emitter detection and locating system 10 configured in accordance with an embodiment of the present invention. The system 10 can be implemented, for example, in a mobile platform to allow for portable emitter locating in any number of environments.

As can be seen, system 10 is capable of receiving RF signals from any number of RF emitter devices 50 located in the search area or field of view (FOV) of the system 10. The example RF emitter devices 50 depicted include laptop 50a, PDA 50b, cell phone 50c, and wireless access point 50d. Each of these devices 50 can be, for example, IEEE 802.11 compliant RF emitters. In a more general sense, devices 50 can operate in accordance with any wireless communication protocol that emits a signal capable of being detected by system 10.

The devices 50 can be located, for example, in a building or outdoors in a park area or along a roadside. The system 10 can be located in the same building, a different building, or outside as well. In short, system 10 can detect and locate devices 50 regardless of the environment (multipath or not) associated with the respective locations of system 10 and devices 50. The distance between the system 10 and devices 50 can vary depending on factors such as transmit power and the communication protocols employed. In an embodiment using IEEE 802.11 communication protocols, the distance can be, for instance, out to hundreds of meters.

Figure 2:
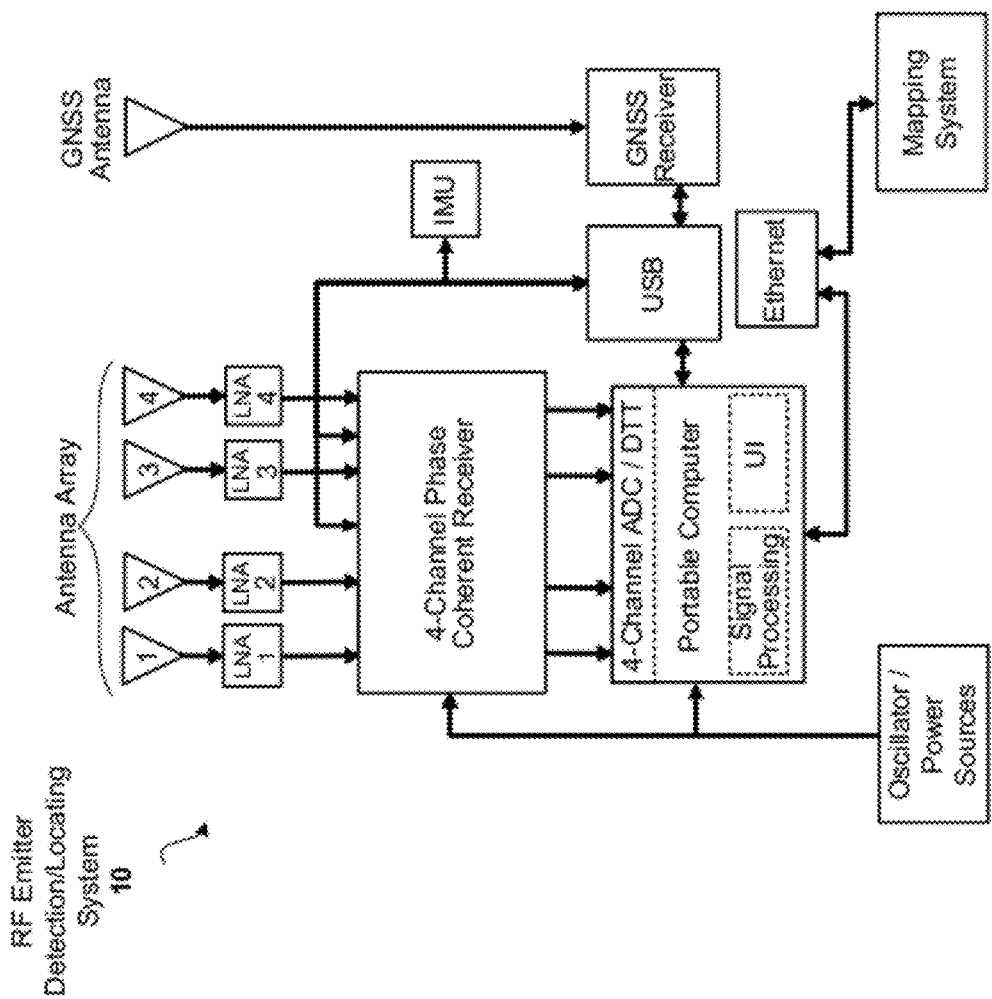
FIG. 2 illustrates a detailed block diagram of the RF emitter detection and locating system shown in FIG. 1, configured in accordance with an embodiment of the present invention.

FIG. 2 illustrates a detailed block diagram of the RF emitter detection and locating system 10, configured in accordance with an embodiment of the present invention. As can be seen, the system 10 generally includes a portable computer, an antenna array operatively coupled to a 4-channel phase coherent receiver by way of four low noise amplifiers (LNA 1 through 4), oscillator and power sources, an inertial measurement unit (IMU), a GNSS antenna coupled to a GNSS receiver which is in turn operatively coupled to the portable computer via a universal serial bus (USB) port, and a mapping module operatively coupled to the portable computer via an Ethernet bus port. The portable computer includes user interface (UI) and signal processing functionality, as well as a 4-channel analog-digital interface comprising analog to digital conversion (ADC) and digital tuner translator (DTT) capability.

The power source can be implemented with conventional battery technology and provides power to the componentry requiring power to operate, thereby enabling portability system 10. The battery may be rechargeable, if so desired and as commonly done with battery powered devices. In some embodiments, note that the power source may be distributed or otherwise comprised of multiple batteries, each dedicated to providing power to particular componentry as needed. In one specific example case, the power source is derived from a 12 VDC vehicle battery.

The oscillator source provides one or more local oscillation (clock) signals, and can also be implemented with conventional technology (e.g., signal generator or crystal or other suitable clock source) and enables phase coherency in the signal recording chain. In particular, all local oscillator signals, whether analog or digital, used as part of the frequency conversion (mixing) process are matched in phase across all the antenna elements to be combined as part of the signal separation and geolocation process. In one example embodiment, a common oscillator source is used for all clocking in system 10, and can be stepped down or up as needed.

The RF front-end, including the antenna array (antennas 1-4), low noise amplifiers (LNAs 1-4), and 4-channel phase coherent receiver, can be implemented, for example, using commercial off-the-shelf (COTS) equipment or otherwise conventional technology. Note that the low noise amplifiers 1-4 are optional, and other embodiments need not include them depending on factors such as the output signals from the antenna array and the desired power of the signals to be received at the analog/digital interface (ADC/DTT). In one example embodiment, the LNAs 1-4 amplify the signals received from the respective antenna elements 1-4 by +10 dB to +20 dB to overcome the inherent noise in the subsequent receiver. Further note that in this example embodiment there are four phase coherent channels provided, but other embodiments may include any number of phase coherent channels (i.e., two or more channels), each having a corresponding antenna element, receiver, and analog/digital interface.

In accordance with one specific example embodiment, the 4-channel phase coherent receiver is implemented with two 2-channel DRS SI-9144 coherent receivers (produced by DRS Technologies, Inc) operatively coupled in a master/slave configuration, with a 20 MHz to 3000 MHz tuning range. In one such specific case, four phase coherent tuner channels are provided, each having a 30 MHz bandwidth, 70 MHz intermediate frequency (IF), and 55 dB of gain (suitable tolerances can be applied to each parameter, such as +/−20%, or better). As will be apparent in light of this disclosure, any number of suitable tuners capable of tuning over the spectrum of interest (whether narrow or broad) and at a sufficient resolution (e.g., 100 KHz steps) can be used.

The GNSS receiver and GNSS antenna can be implemented with conventional GNSS receiver and antenna technology. The GNSS receiver, which can be operatively coupled to the portable computer by a USB port or other suitable interface (e.g., RS-232 serial port) or otherwise integrated into portable computer, provides a GNSS compass and positioning system that computes heading and positioning using the GNSS antenna. Other suitable GNSS receivers and antennas can be used as well, as will be apparent in light of this disclosure. In any such cases, the portable computer is configured to accumulate bearings provided by GNSS receiver to produce a geolocation, which can then be provided, for instance, on a map display.

Figure 3A:
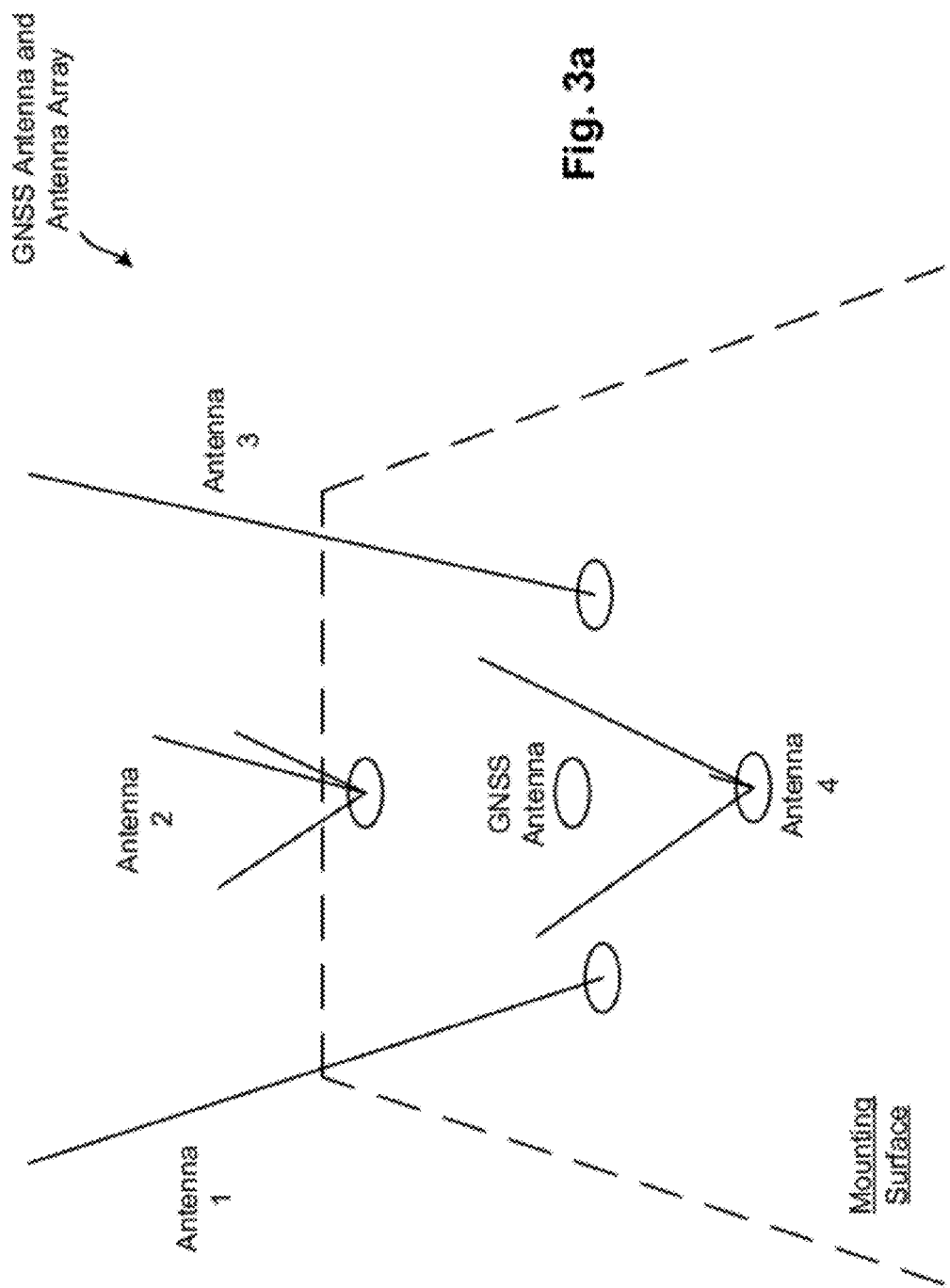
FIG. 3a illustrates an antenna array and a GNSS antenna that can be employed by the RF emitter detection and locating system shown in FIG. 2, configured in accordance with an embodiment of the present invention.

The antenna array can be implemented, for example, using broadband omni-directional antennas. In other embodiments where narrow bandwidth is acceptable, directional antennas can be used. As will further be appreciated, the frequency range of the incident signals captured by the antenna array can vary, and may be either narrow or wide band, depending on the target application. In one example embodiment, antenna elements 1-4 of the antenna array are implemented with four magnetic mount broadband omni-directional antennas operating in the range of 200 MHz to 1000 MHz, and configured in a kite layout along with the GNSS antenna, such as the example configuration shown in FIG. 3a, to provide unambiguous 360 degree arrival with sufficient resolution. The spacing between the various antenna elements can vary, but in one specific such example configuration is as follows: from the magnetic base center of the GNSS antenna to the magnetic base center of antenna 2 is a distance of 25.5 inches; from the magnetic base center of the GNSS antenna to the magnetic base center of antenna 4 is a distance of 12.5 inches; from the magnetic base center of the GNSS antenna to the magnetic base center of antenna 1 is a distance of 12.5 inches; and from the magnetic base center of the GNSS antenna to the magnetic base center of antenna 3 is a distance of 12.5 inches. The mounting surface upon which the antennas are mounted can be, for example, the metal roof of a ground vehicle. As will be appreciated, the size and configuration of the individual antenna elements making up the array will depend on the frequency band of interest. Numerous antenna types and layout schemes will be apparent in light of this disclosure, depending on factors such as the frequency band of interest, desired resolution, type of platform (ground-based, aerial-based, water-based, etc). The claimed invention is not intended to be limited to any particular antenna types and layout scheme.

The IMU, which can also be implemented as conventionally done, measures and reports on the platform's velocity, orientation, magnetic and gravitational forces, using a combination of accelerometers and gyroscopes. The data reported by the IMU can be provided to the portable computer via the USB interface (or other suitable interface), which allows the portable computer to calculate the platform's current position based on velocity and time (by way of dead reckoning). As will be appreciated in light of this disclosure, other embodiments may have only one of the GNSS receiver/antenna or the IMU, as the respective GNSS and dead reckoning techniques can be used together or individually, in accordance with embodiments of the present invention.

As previously indicated, the analog/digital interface including the ADC and DTT modules can be implemented in hardware within the portable computer. Other embodiments may implement this functionality in discrete modules external to the portable computer, or internal to the multi-channel phase coherent receiver. In any case, the ADC receives the analog signals output by the multi-channel phase coherent receiver, and samples those signals at a high rate and wide bandwidth (e.g., 4-channel ADC with each channel configured with 14 bits and capable of 100 Million samples/second of an analog signal that is centered at 70 MHz with a bandwidth of up to 30 MHz). The DTT then selects the exact frequency desired and reduces the bandwidth/sample rate to something more suitable for subsequent processing (e.g., 4-channel DTT configured with cascaded-integrator-comb high rate decimation, 80% bandwidth such as 20 KHz at 25,000 to 125,000 samples/second of 24/24 bit quadrature sampling, I/Q or complex). A number of commercial products that carryout such an ADC/DTT function of the analog/digital interface are available. For instance, and in accordance with one example embodiment, the 4-channel ADC/DTT function of system 10 can be implemented using an ICS-554 card produced by GE Intelligent Platforms (which is part of General Electric Company). As will be appreciated, the ICS-554 connects to the bus structure of the portable computer.

The optional mapping module, which operatively couples to the portable computer via an Ethernet hub in this example embodiment shown in FIG. 2, can be implemented with a laptop executing a mapping and display application that overlays information with respect to targets and/or other mappable information of interest on a map display (e.g., such as RAPTOR produced by GL Industrial Services USA Inc, or GOOGLE EARTH produced by Google Inc). The mapping module can be used to display the targeting results from the system 10 and to set the system operating parameters, if so desired. Any number of computing platforms can be used to implement the optional mapping module. Further note that any number of conventional networking/connectivity technologies can be used here to operatively couple the components of system 10, and embodiments are not intended to be limited to Ethernet and/or USB based solutions.

The portable computer can be implemented, for example, with a ruggedized laptop or other suitable portable computing device, such as those produced by Getac Technology Corporation. Any number of other suitable portable computing platforms can be used to implement the portable computer. As previously explained, the portable computer can be configured with a multi-channel ADC/DTT card or module. In addition, the portable computer may further include a user-application environment such as MATLAB for user interface and signal processing capability, as described herein. Data recording by the portable computer can be triggered, for example, by the GNSS receiver at a suitable data recording rate (e.g., 1 pulse/second or PPS) and at pre-programmed times. The recorded data can thus be time stamped for later synchronization with navigational data. In one specific example embodiment, a data record is stored in memory of the portable computer every 5 to 10 seconds. Additional details of the portable computer will be discussed with reference to FIGS. 3b, 4, 5a-5c, and 6.

Portable Computer

Figure 3B:
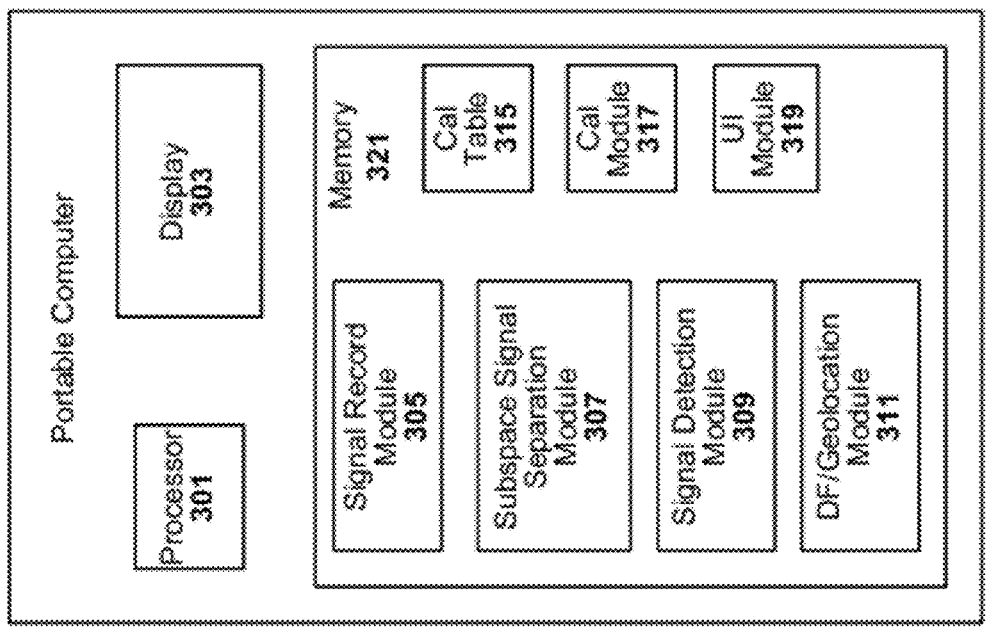
FIG. 3b illustrates a portable computer or processor that can be employed by the RF emitter detection and locating system shown in FIG. 2, configured in accordance with an embodiment of the present invention.

FIG. 3b illustrates a portable computer or processor that can be employed by the RF emitter detection and locating system shown in FIG. 2, configured in accordance with an embodiment of the present invention. As can be seen, the portable computer includes a processor 301, a display 303, and a memory 321. The memory 321 has a number of coded modules (software/instructions) stored therein, including a calibration (cal) module 317 and cal table 315, a user interface (UI) module 319, a signal record module 305, a subspace signal separation module 307, a signal detection module 309, and direction finding (DF)/geolocation module 311. Other conventional portable computer componentry and/or functionality not shown or discussed will be apparent in light of this disclosure (e.g., busses, storage mechanisms, co-processor, graphics card, operating system, user input mechanisms, etc).

As previously explained, the portable computer can be implemented with conventional technology, including the display 303 (e.g., LCD display), processor 301 (e.g., Intel® Pentium® class processors, or other suitable microprocessors), and memory 321 (e.g., any RAM, ROM, cache, or combination thereof typically present in a computing device). In general, memory 321 may be any non-transitory processor-readable medium. However, as will be explained in turn, the cal module 317 and cal table 315, UI module 319, signal record module 305, subspace signal separation module 307, signal detection module 309, and DF/geolocation module 311 are programmed or otherwise configured to carryout functionality described herein.

Each of the modules (cal module 317, UI module 319, signal record module 305, subspace signal separation module 307, signal detection module 309, and DF/geolocation module 311) can be implemented, for example, as a set of instructions or code that when accessed from memory 321 and executed by the processor 301, cause or otherwise facilitate emitter detection and locating techniques described herein to be carried out. In other embodiments, each of the modules can be implemented in hardware such as purpose-built semiconductor or gate-level logic (e.g., FPGA or ASIC), or otherwise hard-coded. Each of the functional modules will be discussed in turn.

The system 10 is capable of ad-hoc installation onto any vehicle, and there is no requirement for knowledge and modeling of the exact metallic configuration of the vehicle and how it will interact with the antenna/receiver sub-system. Rather, the system 10 can be installed in the desired vehicle and then calibrated for proper operation with respect to that particular vehicle using the cal module 317. The cal module 317 is programmed or otherwise configured for carrying out a field calibration, by measuring the antenna array response to incident electromagnetic radiation from a known source located at a known location. The array configuration and spacing/layout can be, for example, as discussed with reference to FIG. 3a (e.g., broadband omni-directional antennas operating in the range of 100 MHz to 3000 MHz, or 200 MHz to 1000 MHz). The cal module 317 generates the calibration table 315.

The calibration table 315 can be, for example, any suitable data storage element/structure populated with gold-standard response data, including I/Q and angle response data for each antenna element (e.g., antennas 1-4, in the example embodiment of FIG. 2) over the spectrum of interest. The gold-standard response data may be, for instance, empirical data measured by the system 10 in a multipath environment under known conditions (e.g., known emitter source and location). For example, and in accordance with one example embodiment, the operator of system 10 can enter the precise GNSS location of a calibration emitter source. As the operator maneuvers the vehicle configured with system 10 around the calibration emitter source located at that precise GNSS location, system 10 can monitor and collect detection data from that source. The data collection can be executed at a resolution suitable to the target frequency range. For instance, given a target frequency range of operation (e.g., 100 MHz to 3000 MHz), calibration can be made at various frequencies as the antenna array characteristics change as a function of wavelength. In one example embodiment, calibration is performed on a uniform logarithmic scale around the frequencies of interest. For instance, to calibrate the system 10 for operation over the region of spectrum from 257 MHz to 514 MHz, calibration could be carried out at approximately every 33 MHz (e.g., 257, 280, 306, 333, 363, 396, 432, 471 and 514 MHz), or for each unique target system emission frequency. Other such resolution/spacing schemes can be used as well, as will be appreciated in light of this disclosure. For each frequency for which calibration data is desired, the user can engage the calibration module of system 10 by, for example, pressing or otherwise selecting a cal data generation button (or other suitable user interface mechanism). Alternatively, the gold-standard response data can be theoretical data (assuming the theoretical data is sufficiently accurate to provide accurate results). In any such cases, the calibration table 315 can be populated with gold-standard data for any number of frequencies, such that once the system 10 is calibrated and deployed, detected signals from potential target emitter can be correlated to the gold-standard data to geolocate the target emitter. Each calibration result (e.g., plots of normalized I/Q and angle response data over spectrum of interest) can be abstracted to a figure of merit (FOM) to facilitate go/no go decisions during correlation process to measured target data. As will be discussed in turn, correlation interferometer geolocation can be used to resolve any ambiguities at higher frequencies through non-linear motion.

The UI module 319 is programmed or otherwise configured to allow for user control (e.g., wherein user controls are implemented as a graphical user interface (GUI) with touch screen functionality). Example user controls provisioned for the user interface by UI module 319 allow a user to control and/or task the system 10 to carryout functionality described herein. FIGS. 4a-c illustrate example GUI displays that may be implemented by the UI module 319, in accordance with an example embodiment of the present invention, and will be discussed in turn.

The signal record module 305 is programmed or otherwise configured to allow system 10 to survey search area to record signals of interest from potential target emitters, in that incident signals are captured by the four elements of the antenna array and processed through the 4-channel phase coherent receiver and 4-channel ADC/DTT interface, and stored for subsequent analysis/processing. Data recording can be, for example, manually triggered (e.g., via UI mechanism), or as previously explained automatically triggered by GNSS at pre-programmed times (e.g., 1 PPS). Data can be time stamped for later synchronization with navigational data from GNSS receiver. As previously explained, the signal recording implemented by the signal record module 305 is carried out with all frequency conversions being performed in a phase coherent fashion, where all local analog and/or digital oscillators used in the frequency conversion (mixing) process are matched in phase across all the antenna elements of the antenna array to be combined as part of the signal separation and geolocation process. Note that implementations of the signal recording function executed by module 305 can operate in either the analog or digital domains, and include all analog frequency conversions prior to final digital conversion, as well as direct digital sampling of the RF signals from the antenna array with all conversions performed digitally. Other variations will be apparent in light of this disclosure. The signal record module 305 can store the resulting data records in the memory 321 or other suitable storage facility accessible by the processor 301. In one specific example embodiment, the signal record module 305 is configured to record signals of interest from potential target emitters for an interval appropriate to recognize the target signal. In one specific example embodiment this interval is 6.35 seconds. The data captured during this interval being processed through the 4-channel phase coherent receiver and 4-channel ADC/DTT interface and forming one data record for storage in memory 321. Any number of data records can be captured and stored.

The subspace signal separation module 307 is programmed or otherwise configured to channelize recorded signal data and to identify subspace of each channel using singular value decomposition (SVD). Such blind adaptive subspace-separation can be used to improve detection in the presence of interference. In one specific example embodiment, the subspace signal separation module 307 can implement a high resolution channelizer such as one with 10 Hz channel spacing, 20 Hz bandwidth, and an 80 Hz complex sample rate. In general, channelizer parameters can be specific to the signals being sought in terms of channel parameters (e.g., channel bandwidth, sample rate, frequency, modulation/code type such as on-off keying, binary phase coding, etc). The input of the subspace signal separation module 307 can be separated into one or more frequency selective channels. Note that this channelizer function may be skipped if the receiver has already selected the appropriate channel. For instance, and as previously explained, the example embodiment shown in FIG. 2 includes four parallel receiver channels digitized, but other embodiments can have any number of channels greater than one. In any such cases, the receiver channels may provide the channelized data. Assuming further channelization is needed, and continuing with the example embodiment of FIG. 2, there are four channelizer inputs (one from each antenna element of the array). In one specific such embodiments, each data record is 508 samples long (6.35 second sampling interval). As will be appreciated, the use of 508 samples is an example for a particular application. In a more general sense, the data record can be any length greater than the number of channels that is suitable for recognizing the presence of the desired signal. Thus, the signals recorded from the antenna can be represented as X, which equals a 508×4 complex matrix. The subspace signal separation module 307 operates to compute the Singular Value Decomposition [U S V]=svd(X), where X=U S $V^H$, U=508×4, S=4×4, and V=4×4. U represents the unit length orthogonal subspace vectors. S represents the singular values (diagonal matrix), essentially the scaling values. V represents the mixing matrix and is a unitary matrix. The SVD has the property that, if X is a linear combination of orthogonal signals, then the columns of US will represent the unmixed signals. In addition, y=X V, where the columns of y contain the orthogonal subspace channels. Thus, in accordance with an embodiment of the present invention, the subspace signal separation module 307 applies the SVD to the spatial separation of signals received on multiple antennas from one another (e.g., a desired signal from an interfering transmitter). In some such embodiments, application of the SVD is preceded by a channelizer function to provide a multitude of narrow channels (e.g., 200 Hz or less). In other embodiments, the channelization is provided by the N-channel phase coherent receiver (N=4 in the example embodiment of FIG. 2).

The signal detection module 309 is programmed or otherwise configured to analyze the subspace of each channel for the presence of target signal. A column of y is one subspace of one channel. In one example embodiment, the signal detection module 309 applies an appropriate signal recognition operation that results in a True/False indication for the presence of the target signal. If True, the signal detection module 309 detects the amplitude (or power) of that target signal. For the subspace in which the target signal is detected, the corresponding column of V contains the mixing coefficients, which are equivalent to the measured complex voltages (antenna response vector) that are used as inputs to the DF/geolocation module 311. If the target signal is detected in more than one subspace (column of y), then the corresponding columns of V can be combined using a weighted sum, where the weight is the amplitude of the detected signal to create the antenna response vector. The weighted sum of the columns of the V matrix can then be used as the antenna response vector for direction finding and/or geolocation carried out by the DF/geolocation module 311.

There are a number of interference and array processing considerations relevant to the signal detection link budget. In particular, and with respect to the example embodiment shown in FIG. 2, for four antennas, subspace array processing typically produces −6 to +6 dB signal to noise ratio (SNR) gain depending on interference relative location, input SNR, and antenna patterns. In addition, subspace array processing typically produces 0 to +21 dB signal to interference ratio (SIR) gain depending on interference relative spatial location and environmental factors (e.g., vehicle motion, multipath environment). As will be appreciated, even higher levels of interference can be suppressed by the techniques provided herein under favorable conditions.

The DF/geolocation module 311 is programmed or otherwise configured to direction find and/or geolocate the target signal, after that signal has been separated from the interference and the voltage measured on the antennas (1 through 4 in the example embodiment of FIG. 2) of the array. As previously explained, and in accordance with one embodiment, the DF/geolocation module 311 can be implemented to carry out a non line-of-bearing technique for geolocation, such as the one described U.S. Pat. No. 7,233,285, which is herein incorporated by reference in its entirety. Other embodiments may use a line of bearing approach, if so desired. In any such cases, response vectors (e.g., I/Q and angle response) from the antenna array, as well as the vehicle location (based on GNSS coordinates) can be provided to DF/geolocation module 311, which can be further configured to resolve ambiguities at higher frequencies through non-linear motion. Additional functional and structural details of the DF/geolocation module 311 will be provided with reference to FIG. 4. In some embodiments, the DF/geolocation module 311 may be further configured to accumulate bearings (heading and position data) provided by the GNSS receiver to produce a geolocation, which can then be provided, for instance, on a map display via the mapping module.

Figure 4:
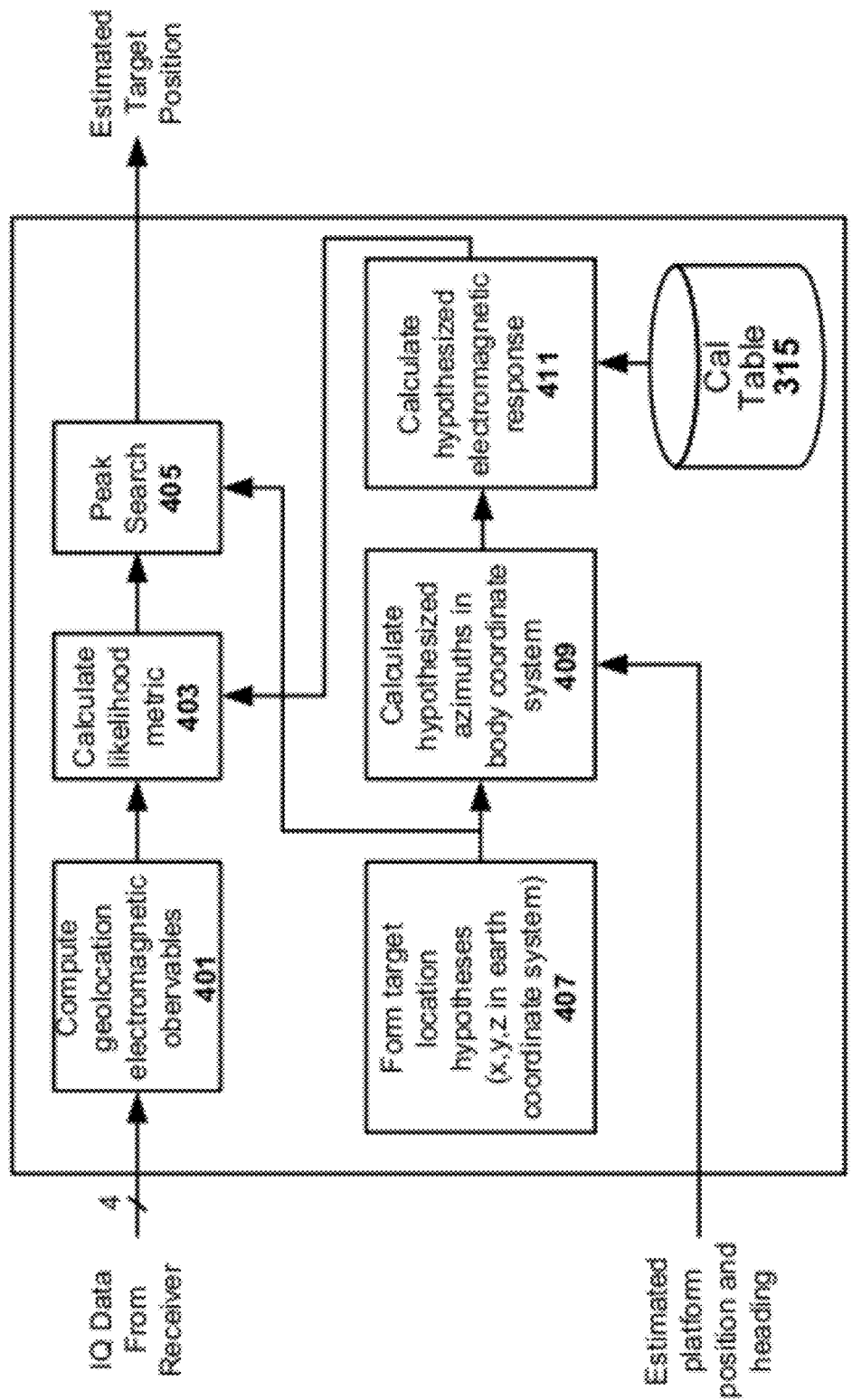
FIG. 4 illustrates a correlation interferometer geolocation method that can be implemented by the RF emitter detection and locating system shown in FIG. 2, configured in accordance with an embodiment of the present invention.

FIG. 4 illustrates a correlation interferometer geolocation (CIGL) algorithm that can be implemented by the RF emitter detection and locating system shown in FIG. 2, configured in accordance with an embodiment of the present invention. The CIGL algorithm essentially compares the set of measured amplitudes and phase-differences (received a from target emitter via the antenna array and N-channel phase coherent receiver) to the sets of amplitudes and phase-differences predicted from one or more hypothesized emitter locations, and picks the location with the best fit (given by the location of the maximum of the likelihood metric).

Each measurement set or data record provided by the signal detection module 309 can be stored (in memory 321 or other suitable storage location) as data in a covariance matrix, and the matrices are each decomposed to yield measured array vectors. Using the calibration table 315 (e.g., array manifold table) developed during calibration of the system 10 and containing testing array vectors (gold-standard I/Q and angle response data), the measured array vectors are each correlated to testing array vectors to develop a correlation surface that includes compensation for perturbations such as vehicle induced electromagnetic scattering. All the correlation surfaces can be summed and normalized, with the resultant summation undergoing conjugate gradient processing to more accurately geo-locate the target emitter.

In more detail, and with reference to FIG. 4, the DF/geolocation module 311 receives data captured by the receiver (I/Q data from the target emitter device). In the example shown, there are four antennas and four corresponding channels, so there are four inputs to the DF/geolocation module 311. The DF/geolocation module 311 computes the geolocation electromagnetic observables (antenna response vector normalized to a reference, such as antenna 1, in one such example embodiment) based on this input data, as indicated at 401. In operation, signals received on the antennas 1 through 4 of the antenna array are sampled, digitized and stored by modules 305, 307, and 309. A processing sequence in accordance with one example embodiment of the present invention is as follows: once a second for 70 consecutive seconds (or other desired sampling period), the received signals are processed by 305, 307, and 309 to produce antenna response vectors.

The DF/geolocation module 311 forms one or more hypothesized emitter locations (e.g., using x,y,z in the earth coordinate system) as indicated at 407, calculates hypothesized azimuths in the coordinate system as indicated at 409, and calculates the hypothesized electromagnetic response (amplitudes and phase-differences) associated with those location hypotheses as indicated at 411. To correct for array distortions, a calibration array manifold correlation table (generally designated as calibration table 315 in FIGS. 2 and 4) constructed during system 10 calibration is accessed to read out data that defines geometric grid locations that define a correlation surface for each of the seventy sampling periods.

With the normalized/calibrated hypothesis response data and the measured response data from the target emitter, the DF/geolocation module 311 can then calculate likelihood metric data as indicated at 403, and perform a peak search to identify the estimated target emitter position as indicated at 405. For instance, and continuing with the previous example case, over the seventy seconds there is data calculated for seventy geometric correlation surfaces. Stated another way, geolocation of a target emitter is determined by a correlation of measured array vectors, in terms of the measured covariance signal array vectors, with calibration or testing voltage array vectors stored during calibration of the system 10. The data sets for the seventy correlation surfaces are summed and normalized to produce a summed geometric correlation surface which is used to identify the geolocation of an emitter with respect to the vehicle/platform. Summing the computed seventy correlation surfaces reduces extraneous correlation peaks and develops a maximum correlation peak at the correct geolocation of the target emitter. Each independent geometric correlation surface has a number of peaks, valleys and ridge-lines. Under ideal conditions, the highest ridge-line of each independent correlation surface points in the direction from the vehicle/platform to the target emitter. One ridge-line of the summation correlation surface contains a well-defined peak that is higher than the correlation values at all other geometric grid locations. The location of this peak identified at 405 indicates the geolocation of the target emitter.

User Interface

Figure 5A:
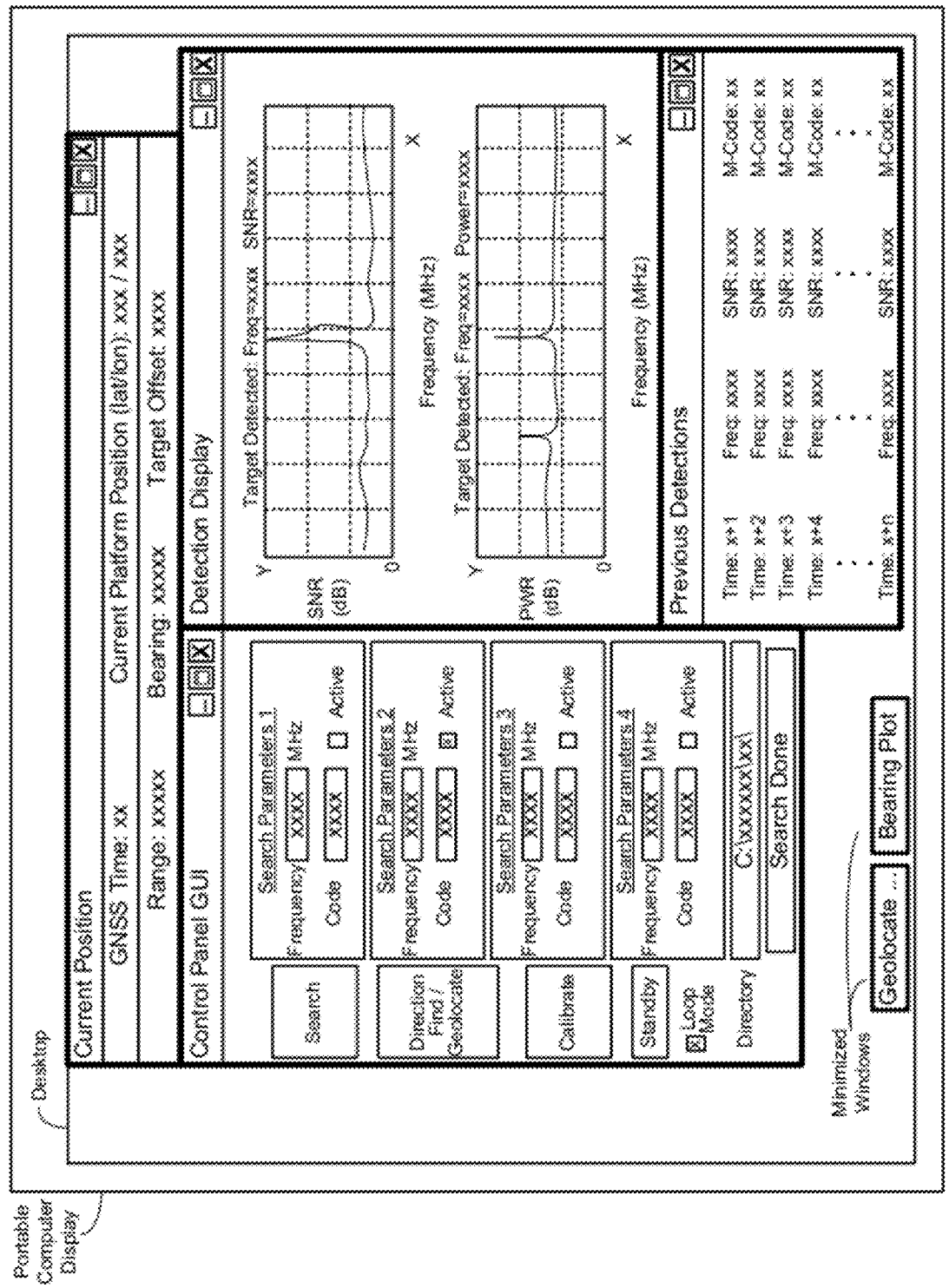
FIGS. 5a-c illustrate a graphical user interface and display of the RF emitter detection and locating system shown in FIG. 2, configured in accordance with an embodiment of the present invention.

As previously indicated, the UI module 319 is configured to allow a user to control and/or task the system 10 to carryout functionality described herein. FIG. 5a illustrates an example operator's search screen display of the portable computer included in system 10 and shown in FIGS. 2 and 3b, in accordance with an embodiment of the present invention. As can be seen, the display shows a desktop having several windows outlined in heavy bold lines, including a Current Position window, a Control Panel GUI window, a Detection Display window, and a Previous Detections window (each of which is open), and a Geolocation Results window and a Bearing Plot window (each of which is minimized at the bottom of the desktop). As will be appreciated, typical desktop and window based functionality can be provided.

The Current Position window shows the current platform position (e.g., lat/lon or other GNSS coordinates) and the time (e.g., GNSS time in weeks). In addition, the Current Position window shows the range to the target (e.g., in meters), the compass bearing to the target (true), and the target offset from the vehicle/platform (e.g., meters). The Detection Display window shows the target detection spectral display (top graph, which includes frequency and SNR of an example target detection signal) and environmental spectral display (bottom graph, which includes frequency and power of example environment signals). The Previous Detections window shows the last X detections (e.g., X=6). As can be seen, each of the recorded detections is time stamped and includes a frequency value, an SNR value, and a modulation format (in this case, M-code).

The Control Panel GUI window shows various user interface controls including a search button, a direction finding/geolocate button, a calibrate button, and standby button. The search button can be used, for instance, to engage the signal record module 305 to survey the search area to record signals of interest from potential target emitters. In some embodiments, the search button can be implemented with both a search wide and search narrow buttons, depending on the frequency range of interest. The direction finding/geolocate button can be used, for example, to engage the DF/geolocation module 311 to direction find and/or geolocate the target signal. In some embodiments, the direction finding/geolocate button can be implemented with multiple buttons to specify the functional components of the geolocation process, such as a geo-collect button (to retrieve target signal I/Q and angle response data from memory), a geo-calculate button (to compute geolocation of target based on retrieved response data), and a geo-clear button (to reset or otherwise clear data for next geolocation sequence). The calibrate button can be used, for instance, to engage the calibration module 317 to carry out a field calibration. In some embodiments, the calibrate button can be implemented with multiple buttons to specify the functional components of the calibration process, such as a cal-collect button (for collecting calibration data from known source) and a cal-generate button (for computing the calibration table 315 based on collected cal data).

Figure 5C:
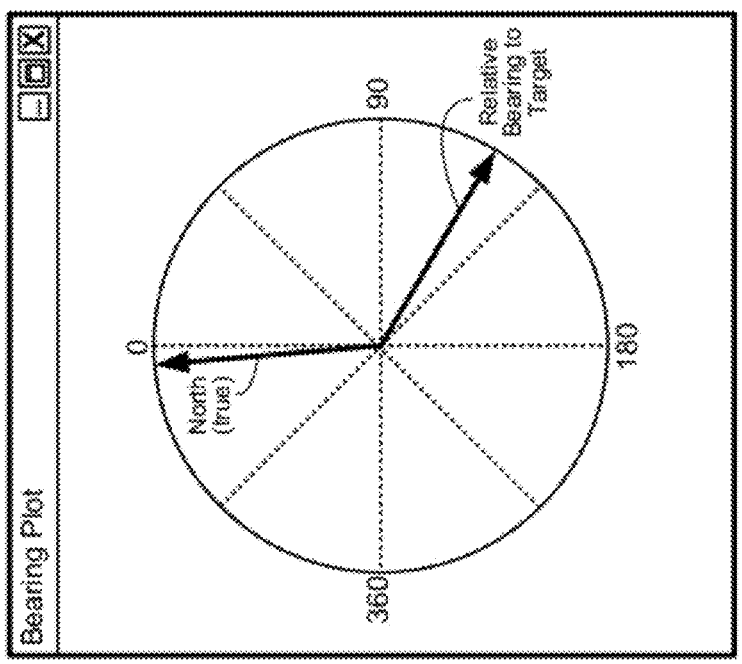
Figure 5B:
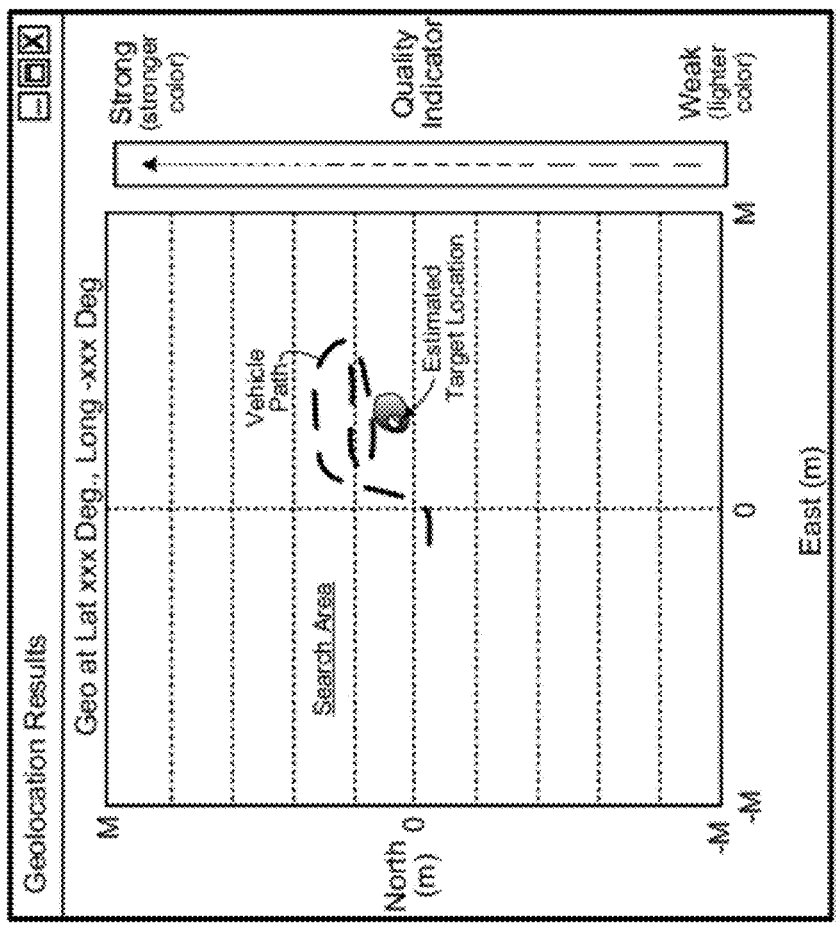

Also shown in FIG. 5a are minimized a Geolocation Results window and a Bearing Plot window. FIG. 5b illustrates the expanded Geolocation Results window, in accordance with an embodiment of the present invention. As can be seen, the search area of system 10 is shown, as is the current vehicle path along which data from the target emitter was collected. At the top of the Geolocation Results window is the geolocation of the target (lat/lon). In one specific example embodiment, the Geolocation Results window includes a color scheme to further indicate the location of the target emitter. A quality indicator as shown in FIG. 5b can be used indicate what colors represent the location of target signals and what colors represent non-target signals. FIG. 5c illustrates the expanded Bearing Plot window, which shows true North and the relative bearing to the target emitter. In some embodiments, the vehicle heading may also be depicted.

Methodology

Figure 6:
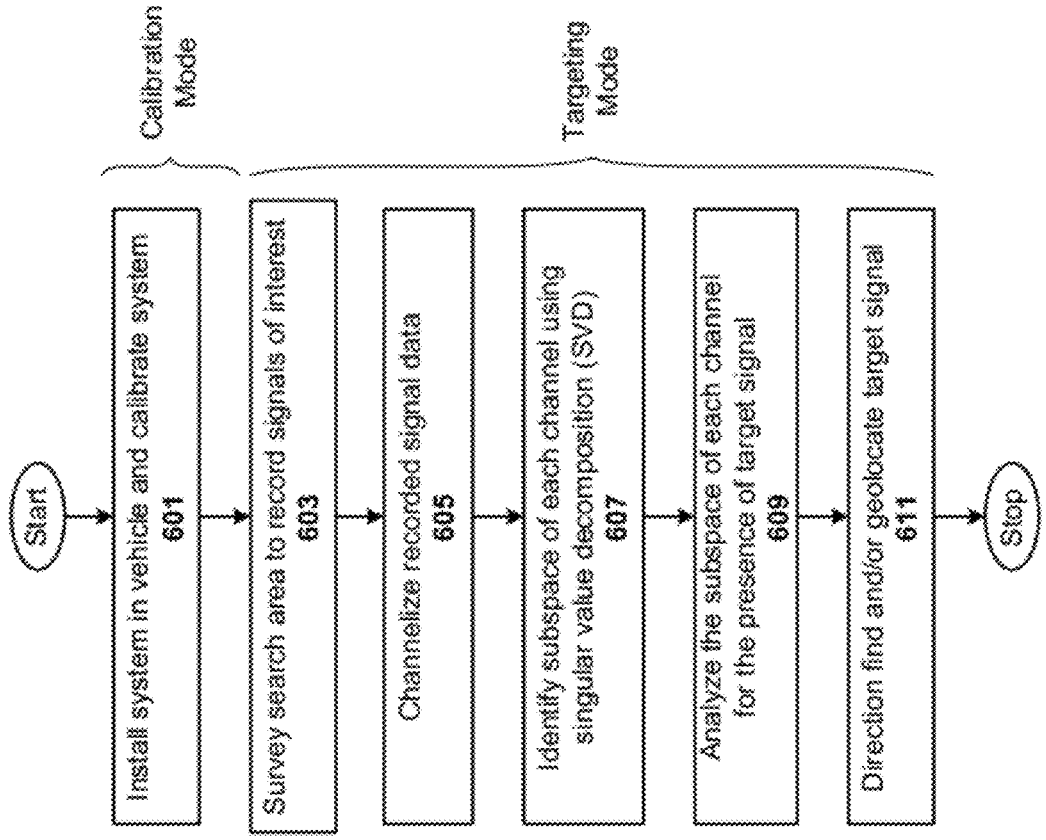
FIG. 6 illustrates a method for detecting and locating an RF emitter, in accordance with an embodiment of the present invention.

FIG. 6 illustrates a method for detecting and locating an RF emitter, in accordance with an embodiment of the present invention. As can be seen, the method includes a calibration mode and a targeting mode, and generally allows for interference mitigation so that geolocation/direction finding techniques can be employed. The method can be carried out, for example, by system 10, but other system configurations will be apparent in light of this disclosure.

Once the system is installed in a ground vehicle (or any other suitable mobile platform), the calibration mode of the method can be executed and includes calibrating 601 the system 10 so as to generate calibration table, as previously described (cal module 317 generates cal table 315). This calibration process generally takes 1 to several minutes (e.g., 5 minutes), depending on the vehicle sample path and sampling interval. Once the calibration table is populated, the method can then switch to the targeting mode, which includes surveying 603 the search area to record signals of interest as previously described (signal record module 305). Recall that signal recording is carried out such that all frequency conversions are performed in a phase coherent fashion. Resulting data records are stored in memory for subsequent processing.

In particular, the method continues with channelizing 605 the recorded signal data. As previously described, the channelizer parameters can be adjusted as necessary to fit the desired target signal characteristics, and the channelization can be implemented, for example, in the subspace signal separation module 307. As also previously described, such channelization may be optional, particularly if the receiver has already selected the appropriate channels. In general, the width and number of channels can be designed to provide the best or otherwise suitable match to the target signal(s) being located.

The method continues with identifying 607 subspace of each channel using SVD (e.g., via subspace signal separation module 307), and analyzing 609 the subspace of each channel for the presence of target signal (e.g., via signal detection module 309), as previously explained. Recall that if the signal is detected in more than one subspace (column of y), then the corresponding columns of V can be combined using a weighted sum, where the weight is the amplitude of the detected signal to create the antenna response vector. In such cases, the weighted sum of the columns of the V matrix can then be used as antenna array response vectors for direction finding and/or geolocation (e.g., CIGL algorithm).

The method continues with direction finding and/or geolocating 611 a target signal. Recall that conventional direction finding and/or geolocation techniques can be used here, as explained herein, where antenna response vectors and vehicle location (e.g., GNSS coordinates) are provided to the CIGL algorithm, for example. This is a non line-of-bearing technique for geolocation. Other embodiments may use other geolocation techniques that rely on lines of bearing (e.g., intersection of two or more lines of bearing indicates a geolocation).

Another example locating technique that can be used for direction finding and/or geolocating 611 is described in U.S. Pat. No. 7,358,891, which is titled "Multipath Resolving Correlation Interferometer Direction Finding", which is herein incorporated by reference in its entirety. The techniques described in this patent include searching for a location that correlates to antenna response using polarization diversity. In particular, the eigenvalues for the eigenvectors of the matrices generated by the signal samples recorded on the horizontally polarized array are compared to the eigenvalues for the eigenvectors of the covariance matrices generated by the signal samples recorded on the vertically polarized array to determine which signal polarization has the strongest eigenvalue. That eigenvector and the eigenvalues for that signal are selected and used for subsequent signal processing. The antenna response (referred to as eigenvectors in the '891 patent) can be developed as described herein.

The foregoing description of the embodiments of the invention has been presented for the purposes of illustration and description. It is not intended to be exhaustive or to limit the invention to the precise form disclosed. Many modifications and variations are possible in light of this disclosure. For instance, some embodiments are discussed in the context of a vehicle-based (e.g., auto, truck, motorcycle, airplane, ship, etc). Other example embodiments may be backpack-based, such that a user can don the backpack and control and task system using a wired or wireless remote having a small display screen to allow user to see estimated target emitter locations. Alternatively, such a backpack-based system can be configured to respond to voice commands, and aurally present estimated target emitter locations so that user's hands remain free. It is intended that the scope of the invention be limited not by this detailed description, but rather by the claims appended hereto.

What is claimed is:

1. A system for detecting and locating an RF emitter in a search area, comprising:
    an antenna array having a plurality of antenna elements;
    a phase coherent receiver having a channel for each of the antenna elements, wherein all frequency conversions carried out by the phase coherent receiver are performed in a phase coherent fashion across all the channels;
    a signal record module for recording emitter signals of interest received from the search area via the antenna array and phase coherent receiver;
    a memory for storing data records generated by the signal record module;
    a subspace signal separation module for receiving the data records and identifying subspace of each channel using singular value decomposition (SVD);
    a signal detection module for analyzing the subspace of each channel for the presence of a target signal; and
    a locating module for direction finding and/or geolocating the target signal.

2. The system of claim 1 wherein the system is installed in a ground vehicle.

3. The system of claim 1 further comprising:
    a calibration module for carrying out a field calibration of the system, by measuring antenna array response to incident electromagnetic radiation from a known source located at a known location.

4. The system of claim 3 wherein the calibration module is configured to generate a calibration table populated with gold-standard response data to which target emitter response data can be correlated.

5. The system of claim 1 wherein the subspace signal separation module is further configured for channelizing data records generated by the signal record module.

6. The system of claim 1 wherein if the target signal is detected in more than one subspace, the signal detection module is further configured to use a weighted sum of mixing matrix columns as an antenna response vector, and the locating module uses the antenna response vector for direction finding and/or geolocation.

7. The system of claim 1 wherein the locating module is configured to accumulate bearings relative to position of the system provided by a Global Navigation Satellite System (GNSS) receiver to produce a geolocation, and wherein the GNSS-based geolocation is provided on a map display.

8. The system of claim 1 wherein the locating module employs a non line-of-bearing technique for geolocation.

9. A method for detecting and locating an RF emitter in a search area, comprising:
    recording emitter signals of interest received from the search area via an array of antenna elements and a phase coherent receiver having a channel for each of the antenna elements, wherein all frequency conversions carried out by the phase coherent receiver are performed in a phase coherent fashion across all the channels;
    storing data records generated by the recording;
    identifying subspace of each channel using singular value decomposition (SVD);
    analyzing the subspace of each channel for the presence of a target signal; and
    direction finding and/or geolocating the target signal.

10. The method of claim 9 further comprising:
    carrying out a field calibration by measuring antenna array response to incident electromagnetic radiation from a known source located at a known location.

11. The method of claim 10 wherein carrying out a field calibration includes generating a calibration table populated with gold-standard response data to which target emitter response data can be correlated.

12. The method of claim 9 further comprising channelizing the data records prior to identifying the subspace of each channel.

13. The method of claim 9 wherein if the target signal is detected in more than one subspace, the method further comprises:

using a weighted sum of mixing matrix columns as an antenna response vector; and using the antenna response vector for direction finding and/or geolocation.

14. The method of claim 9 further comprising accumulating bearings provided by a GNSS receiver to produce a geolocation.

15. The method of claim 14 further comprising providing the GNSS-based geolocation on a map display.

16. A non-transitory processor-readable medium encoded with instructions that, when executed by a processor, cause the processor to execute a process for detecting and locating an RF emitter in a search area, the process comprising:

recording emitter signals of interest received from the search area via an array of antenna elements and a phase coherent receiver having a channel for each of the antenna elements, wherein all frequency conversions carried out by the phase coherent receiver are performed in a phase coherent fashion across all the channels;

storing data records generated by the recording;

identifying subspace of each channel using singular value decomposition (SVD);

analyzing the subspace of each channel for the presence of a target signal; and direction finding and/or geolocating the target signal.

17. The non-transitory processor-readable medium of claim 16 further comprising:

carrying out a field calibration by measuring antenna array response to incident electromagnetic radiation from a known source located at a known location, wherein carrying out a field calibration includes generating a calibration table populated with gold-standard response data to which target emitter response data can be correlated.

18. The non-transitory processor-readable medium of claim 16 wherein the process further comprises channelizing the data records prior to identifying the subspace of each channel.

19. The non-transitory processor-readable medium of claim 16 wherein if the target signal is detected in more than one subspace, the process further comprises:

using a weighted sum of mixing matrix columns as an antenna response vector; and using the antenna response vector for direction finding and/or geolocation.

20. The non-transitory processor-readable medium of claim 16 wherein the process further comprises:

accumulating bearings provided by a GNSS receiver to produce a geolocation; and providing the GNSS-based geolocation on a map display.

* * * * *